United States Patent
Gaal et al.

(10) Patent No.: US 11,212,141 B2
(45) Date of Patent: Dec. 28, 2021

(54) METHODS AND APPARATUS FOR A DATA TRANSMISSION SCHEME FOR NARROW-BAND INTERNET OF THINGS (NB-IOT)

(71) Applicant: QUALCOMM Incorporated, San Diego, CA (US)

(72) Inventors: Peter Gaal, San Diego, CA (US); Hao Xu, San Diego, CA (US); Wanshi Chen, San Diego, CA (US); Xiaofeng Wang, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/376,490

(22) Filed: Dec. 12, 2016

(65) Prior Publication Data

US 2017/0201393 A1     Jul. 13, 2017

Related U.S. Application Data

(60) Provisional application No. 62/276,219, filed on Jan. 7, 2016, provisional application No. 62/280,590, filed
(Continued)

(51) Int. Cl.
*H04L 25/02* (2006.01)
*H04B 7/06* (2006.01)
(Continued)

(52) U.S. Cl.
CPC ......... *H04L 25/0202* (2013.01); *H04B 7/068* (2013.01); *H04B 7/0613* (2013.01);
(Continued)

(58) Field of Classification Search
None
See application file for complete search history.

(56) References Cited

U.S. PATENT DOCUMENTS

| 2002/0075943 A1* | 6/2002 | Kurihara | H04B 1/707 375/146 |
| 2002/0077141 A1* | 6/2002 | Hwang | H04W 52/143 455/522 |

(Continued)

FOREIGN PATENT DOCUMENTS

| CN | 102598537 A | 7/2012 |
| CN | 104995856 A | 10/2015 |

(Continued)

OTHER PUBLICATIONS

Fujitsu: "CSI-RS Design for Virtualized LTE Antenna in LTE-A System", 3GPP Draft; R1-093152, 3rd Generation Partnership Project (3GPP), Mobile Competence Centre; 650, Route Des Lucioles; F-06921 Sophia-Antipolis Cedex; France, No. Shenzhen, China; Aug. 18, 2009, Aug. 18, 2009, XP050351511, pp. 1-7.

(Continued)

*Primary Examiner* — Faruk Hamza
*Assistant Examiner* — Cassandra L Decker
(74) *Attorney, Agent, or Firm* — QUALCOMM Incorporated

(57) ABSTRACT

Certain aspects of the present disclosure relate to methods and apparatus for implementing a data transmission scheme for Narrow-Band Internet of Things (NB-IoT). A User Equipment (UE) combines pairs of antenna ports to generate at least first and second combined antennas ports. The UE receives reference signals transmitted in a narrow band region of a larger system bandwidth, and for each combined port, adds the references signals received on resource elements (REs) of each of the combined pair of antenna ports.

(Continued)

The UE determines channel estimates for each combined antenna port based on the added reference signals for the combined port.

32 Claims, 13 Drawing Sheets

Related U.S. Application Data on Jan. 19, 2016, provisional application No. 62/292,194, filed on Feb. 5, 2016.

(51) Int. Cl.
| | |
|---|---|
| *H04L 5/00* | (2006.01) |
| *H04L 1/06* | (2006.01) |
| *H04L 25/03* | (2006.01) |
| *H04W 84/04* | (2009.01) |
| *H04W 4/70* | (2018.01) |

(52) U.S. Cl.
CPC ......... *H04B 7/0684* (2013.01); *H04L 1/0606* (2013.01); *H04L 5/0023* (2013.01); *H04L 5/0044* (2013.01); *H04L 5/0048* (2013.01); *H04L 25/0204* (2013.01); *H04L 25/0208* (2013.01); *H04L 25/0232* (2013.01); *H04L 25/03866* (2013.01); *H04W 4/70* (2018.02); *H04W 84/042* (2013.01)

(56) References Cited

U.S. PATENT DOCUMENTS

| | | | | |
|---|---|---|---|---|
| 2007/0253321 | A1* | 11/2007 | Akita | H04B 7/022 370/208 |
| 2009/0041151 | A1* | 2/2009 | Khan | H04L 5/0023 375/267 |
| 2009/0060088 | A1* | 3/2009 | Callard | H04B 7/0689 375/299 |
| 2009/0202016 | A1* | 8/2009 | Seong | H04B 7/0426 375/267 |
| 2010/0048214 | A1* | 2/2010 | Usuda | H04B 7/022 455/442 |
| 2011/0038354 | A1* | 2/2011 | Akimoto | H04B 7/0621 370/335 |
| 2011/0105174 | A1* | 5/2011 | Pelletier | H04W 52/367 455/522 |
| 2012/0058791 | A1* | 3/2012 | Bhattad | H04L 1/0606 455/509 |
| 2012/0063530 | A1* | 3/2012 | Nakajima | H04B 7/068 375/267 |
| 2012/0064846 | A1* | 3/2012 | Yokomakura | H04B 7/0689 455/101 |
| 2013/0315081 | A1 | 11/2013 | Kim et al. | |
| 2014/0016681 | A1* | 1/2014 | Muruganathan | H04B 7/0671 375/219 |
| 2014/0233518 | A1* | 8/2014 | Lee | H04J 11/005 370/329 |
| 2014/0307691 | A1* | 10/2014 | Zhang | H04L 1/0606 370/329 |
| 2015/0295670 | A1* | 10/2015 | Seyama | H04J 11/005 370/329 |
| 2016/0028453 | A1* | 1/2016 | Zhou | H04B 7/0456 375/267 |

FOREIGN PATENT DOCUMENTS

| | | |
|---|---|---|
| EP | 1290809 A1 | 3/2003 |
| WO | 2013108742 A1 | 7/2013 |

OTHER PUBLICATIONS

Hanzo L., et al., "OFDM and MC-CDMA for Broadband Multi-User Communications, WLANs, and Broadcasting", OFDM and MCCDMA for Broadband Multi-User Communications, WLANSAND Broadcasting, Jan. 1, 2003 (Jan. 1, 2003), pp. 84-92.
Partial International Search Report—PCT/US2016/066298—ISA/EPO—dated Jul. 21, 2017.
Samsung: "Reference Signal Structure for 4-TX Antenna MIMO", 3GPP TSG RAN WG1 Meeting #47, Riga, Latvia, Nov. 6-10, 2006, 8 Pages.
"3rd Generation Partnership Project; Technical Specification Group Radio Access Network; Evolved Universal Terrestrial Radio Access (E-UTRA); Physical channels and modulation (Release 13)," 3GPP Standard; 3GPP TS 36.211, 3rd Generation Partnership Project (3GPP), Mobile Competence Centre ; 650, Route Des Lucioles ; F-06921 Sophia-Antipolis Cedex ; France, Jan. 5, 2016 (Jan. 5, 2016), vol. RAN WG1, No. V13.0.0, pp. 1-141, XP051047447, [retrieved on Jan. 5, 2016].
Ericsson, "E-UTRA downlink scrambling", 3GPP Draft; R1-060083, 3rd Generation Partnership Project (3GPP), Mobile Competence Centre ; 650, Route Des Lucioles ; F-06921 Sophia-Antipolis Cedex; France, vol. RAN WG1, No. Helsinki, Finland; Jan. 19, 2006, Jan. 19, 2006 (Jan. 19, 2006), XP050111225, 3 pages, [retrieved on Jan. 19, 2006].
International Search Report and Written Opinion—PCT/US2016/066298—ISA/EPO—Sep. 25, 2017.
Taiwan Search Report—TW105141353—TIPO—dated May 11, 2020.
European Search Report —EP20190574—Search Authority—The Hague—dated Nov. 27, 2020.
Nortel: "Re Mapping of SFBC+FSTD Based TxD for RS Power Boosting", 3GPP TSG-RAN Working Group 1 Meeting #50bis, R1-073957, Shanghai, China, Oct. 8-12, 2007, URL: http://www.3gpp.org/ftp/tsg_ran/WG1_RL1/TSGR1_50b/Docs/R1-073957.zip, 13 Pages.
Taiwan Search Report—TW109127343—TIPO—dated Dec. 24, 2020.

* cited by examiner

METHODS AND APPARATUS FOR A DATA TRANSMISSION SCHEME FOR NARROW-BAND INTERNET OF THINGS (NB-IOT)

This application claims priority to U.S. Provisional Application Ser. No. 62/276,219, filed on Jan. 7, 2016, Provisional Application Ser. No. 62/280,590, filed on Jan. 19, 2016, and Provisional Application Ser. No. 62/292,194, filed on Feb. 5, 2016, which are expressly incorporated by reference herein in their entirely.

FIELD

The present disclosure relates generally to wireless communication, and more particularly, to methods and apparatus for a data transmission scheme for Narrow-Band Internet of Things (NB-IoT).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a User Equipment (UE). The method generally includes combining pairs of antenna ports to generate at least first and second combined antenna ports, receiving reference signals transmitted in a narrow band region of a larger system bandwidth, for each combined antenna port, adding the reference signals received on resource elements (REs) of each of the combined pair of antenna ports, and determining channel estimates for each combined antenna port based on the added reference signals for the combined antenna port.

Certain aspects of the present disclosure provide a method for wireless communications by a Base Station (BS). The method generally includes combining pairs of antenna ports to generate at least first and second combined antenna ports, for transmission in a narrow band region of a larger system bandwidth, for each of the first and second combined antenna ports, transmitting same data on corresponding REs of each of the combined pairs of antenna ports, wherein for each of the first and second combined antenna ports, channel estimates are determined by a receiving UE and wherein the data transmitted on the REs are processed by the receiving UE as pairs based on the determined channel estimates.

Certain aspects of the present disclosure provide a method for wireless communications. The method generally includes configuring two or more Resource Blocks (RBs) for transmission in a cell, configuring a same scrambling sequence for the two or more RBs for the transmission in the cell, and scrambling data to be transmitted in each of the RBs with the scrambling sequence.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

DETAILED DESCRIPTION

Figure 1:
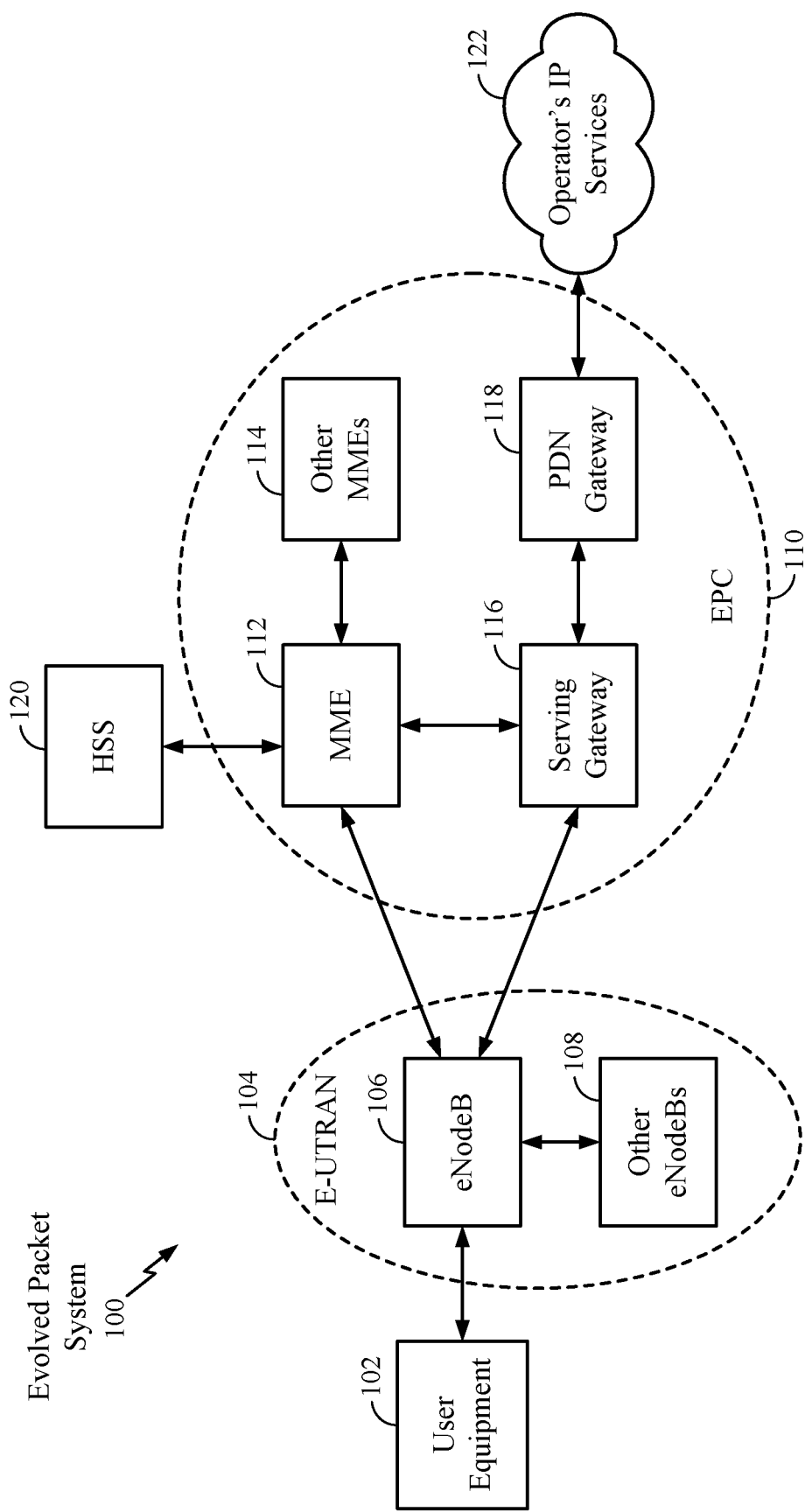
FIG. 1 is a diagram illustrating an example of a network architecture.

Narrow-Band Internet of Things (NB-IoT) is a technology being standardized by the 3GPP standards body. This technology is a narrowband radio technology specially designed for the IoT, hence its name. Special focuses of this standard are on indoor coverage, low cost, long battery life and large number of devices. The NB-IoT technology may be deployed "in-band", utilizing resource blocks within, e.g., a normal LTE or GSM spectrum. In addition, NB-IoT may be deployed in the unused resource blocks within a LTE carrier's guard-band, or "standalone" for deployments in dedicated spectrum.

The in-band version of NB-IoT uses signals embedded in the wide-band LTE signal. In this case an eNB transmits one of 1-port CRS, 2-port CRS, and 4-port CRS. However, an NB-IoT device (e.g., UE) may only support a 2-port based diversity scheme. The eNB may typically transmit a full power signal only if all existing ports participate in the signal/data transmission. But, at the UE end, this would require estimating the channel for four eNB antennas for a UE Rx antenna. Certain aspects of the present disclosure provide a new transmission scheme for the NB-IoT.

In certain aspects, in accordance with the new transmission scheme, a UE combines pairs of antenna ports to generate at least first and second combined antenna ports. For each combined port, the UE adds reference signals received on Resource Elements (REs) of each of the combined pair of antenna ports. The UE then determines channel estimates for each combined antenna port based on the added reference signals for the combined port. In certain aspects, for each of the combined ports, the UE processes data received on data REs in pairs, based on the determined channel estimates of the combined port.

In certain aspects, a Base Station (BS) combines pairs of antenna ports to generate the at least first and second combined antenna ports, for transmission in a narrow band region of a larger system bandwidth. For each of the first and the second combined antenna ports, the BS transmits same data on corresponding REs of each of the combined pairs of antenna ports, wherein a receiving UE determines channel estimates for each of the first and second combined ports, and processes the data received in the REs based on the determined channel estimates.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

FIG. 1 is a diagram illustrating an LTE network architecture 100 in which aspects of the present disclosure may be practiced.

In certain aspects, a UE (e.g., UE 102) combines pairs of antenna ports to generate at least first and second combined antenna ports. For each combined port, the UE adds reference signals received on Resource Elements (REs) of each of the combined pair of antenna ports. The UE then determines channel estimates for each combined antenna port based on the added reference signals for the combined port. In certain aspects, for each of the combined ports, the UE processes data received on data REs in pairs, based on the determined channel estimates of the combined port.

In certain aspects, a Base Station (BS) (e.g., eNB 106 or one of the other eNBs 108) combines pairs of antenna ports to generate the at least first and second combined antenna ports, for transmission in a narrow band region of a larger system bandwidth. For each of the first and the second combined antenna ports, the BS transmits same data on corresponding REs of each of the combined pairs of antenna ports, wherein a receiving UE determines channel estimates for each of the first and second combined ports, and processes the data received in the REs in pairs based on the determined channel estimates.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, a camera/security camera, a gaming/entertainment device, a virtual reality/augmented reality device, a wearable device (e.g., smart watch, smart glasses, smart goggles, smart ring, smart bracelet, smart wrist band, smart jewelry, smart clothing, etc.), a vehicular device, a position location/navigation device (e.g., satellite-based, terrestrial-based, etc.), any other similar functioning device, etc. Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
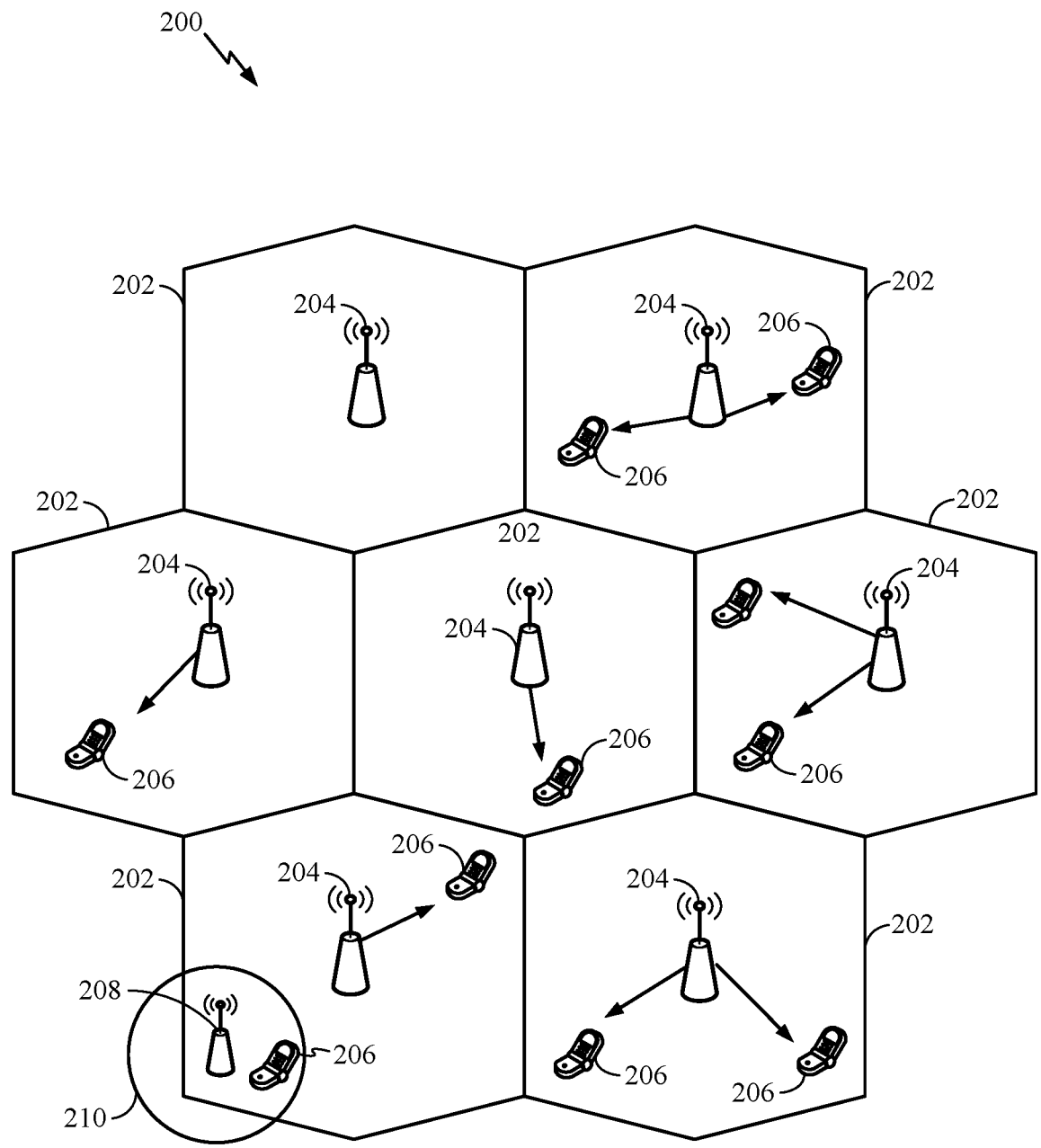
FIG. 2 is a diagram illustrating an example of an access network.

FIG. 2 is a diagram illustrating an example of an access network 200 in an LTE network architecture in which aspects of the present disclosure may be practiced. For example, UEs 206 and eNBs 204 may be configured to implement techniques for implementing a new transmission scheme for NB-IoT described in aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network may be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
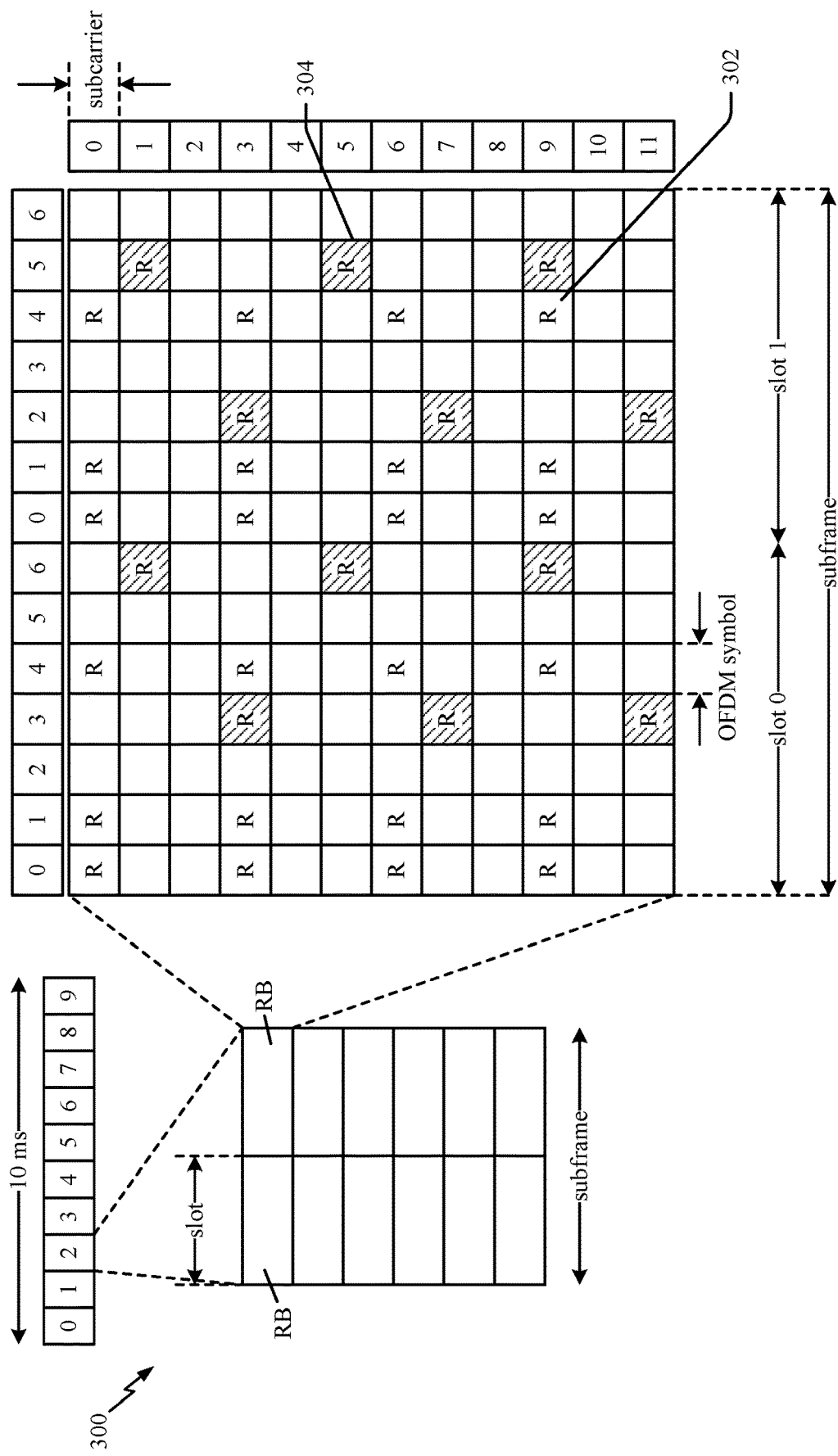
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
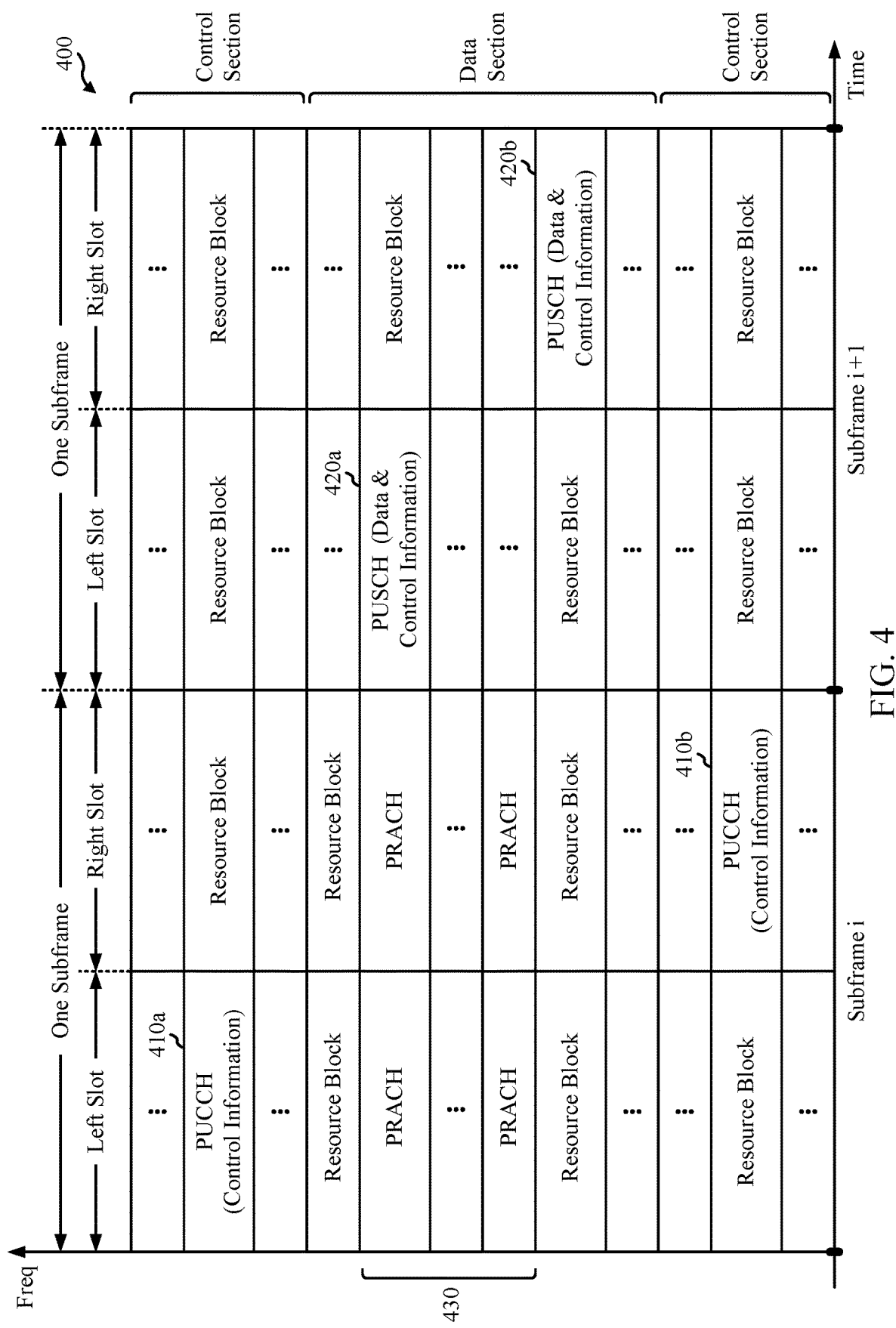
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
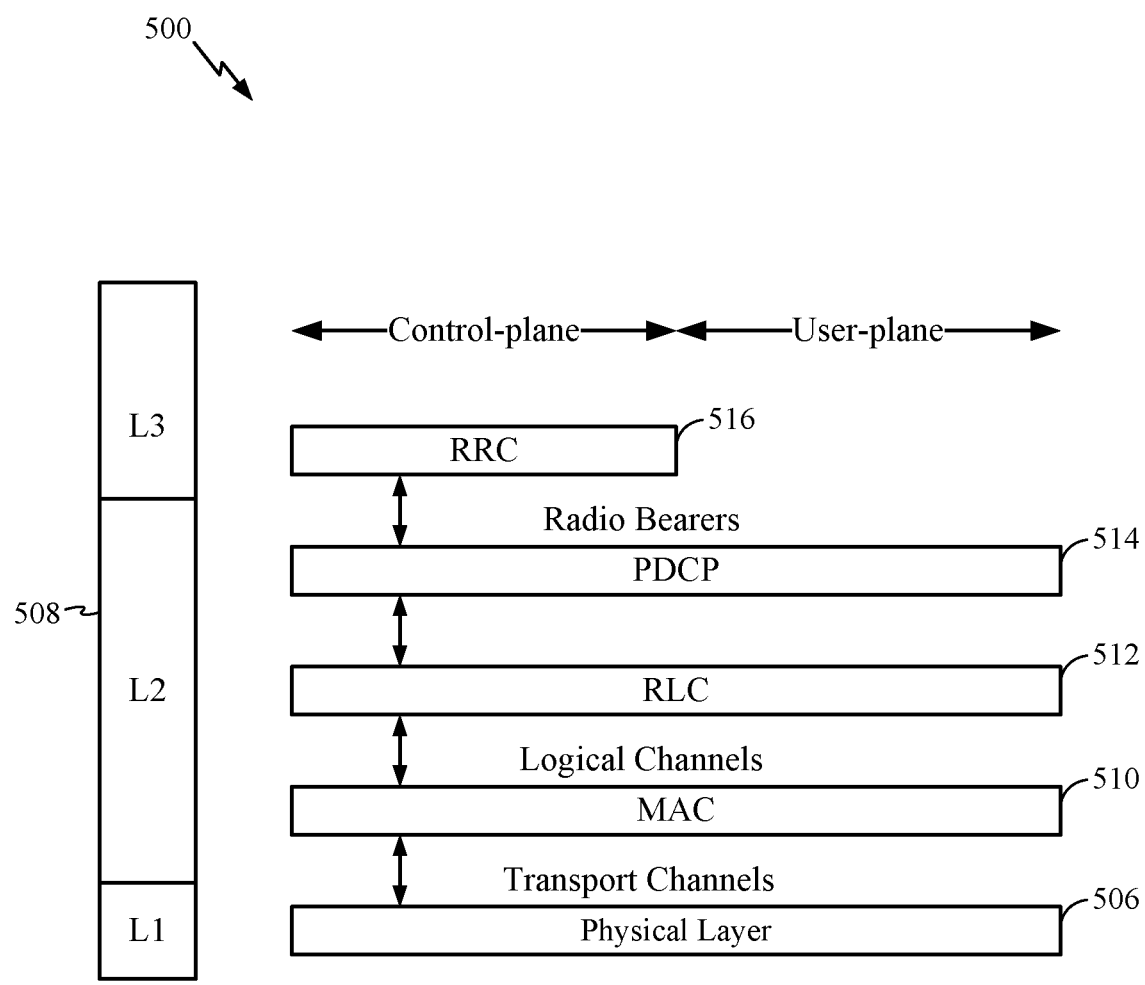
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
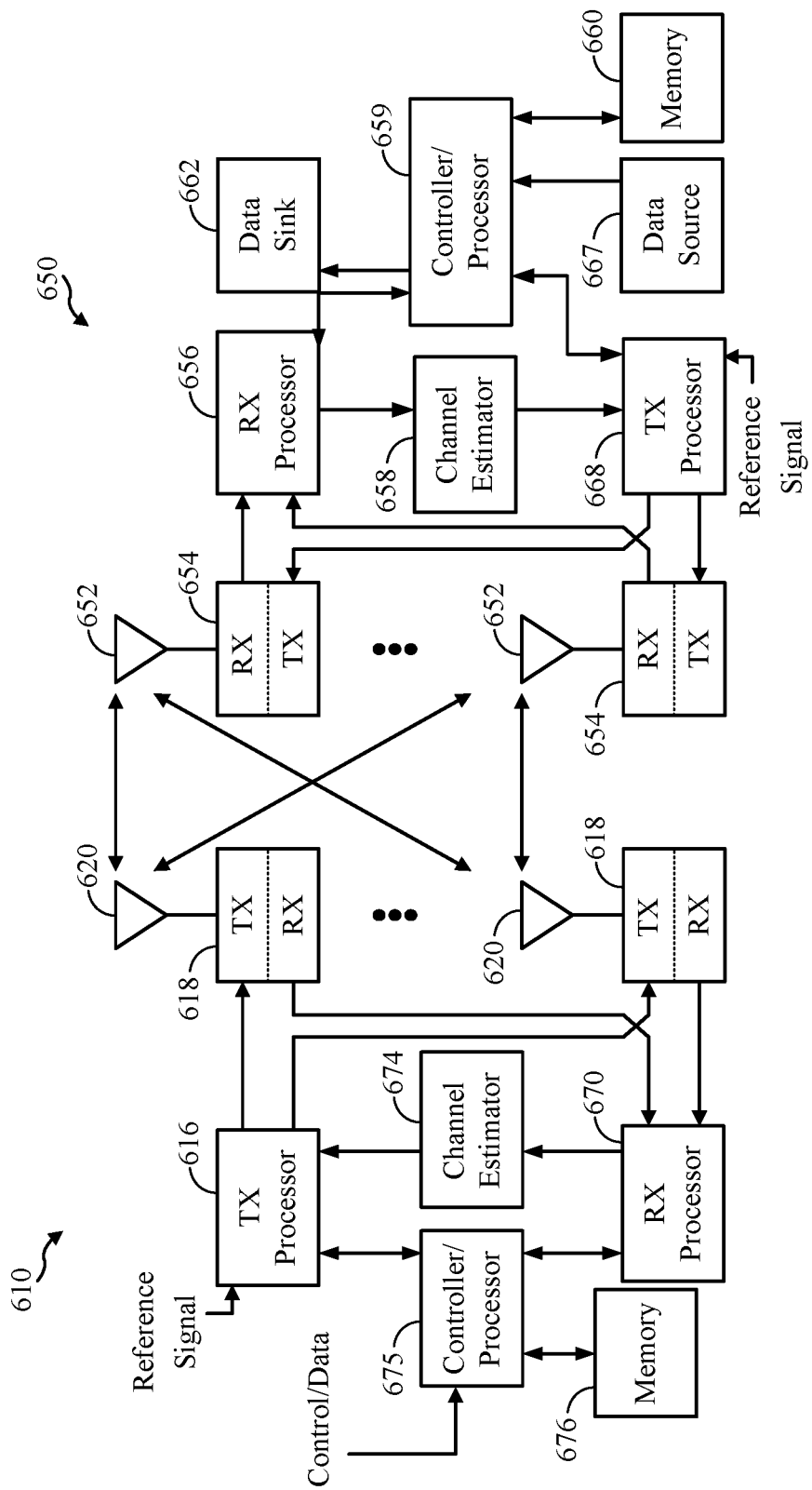
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In certain aspects, a UE (e.g., UE 650) combines pairs of antenna ports to generate at least first and second combined antenna ports. For each combined port, the UE adds reference signals received on Resource Elements (REs) of each of the combined pair of antenna ports. The UE then determines channel estimates for each combined antenna port based on the added reference signals for the combined port. In certain aspects, for each of the combined ports, the UE processes data received on data REs in pairs, based on the determined channel estimates of the combined port.

In certain aspects, a Base Station (BS) (e.g., eNB 610) combines pairs of antenna ports to generate the at least first and second combined antenna ports, for transmission in a narrow band region of a larger system bandwidth. For each of the first and the second combined antenna ports, the BS transmits same data on corresponding REs of each of the combined pairs of antenna ports, wherein a receiving UE determines channel estimates for each of the first and second combined ports, and processes the data received in the REs in pairs based on the determined channel estimates.

It may be noted that the UE noted above for implementing the new transmission scheme for NB IoT in accordance with certain aspects of the present disclosure may be implemented by a combination of one or more of the controller 659, the RX processor 656, the channel estimator 658 and/or transceiver 654 at the UE 650, for example. Further, the BS may be implemented by a combination of one or more of the controller 675, the TX processor and/or the transceiver 618 at the eNB 610.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 8:
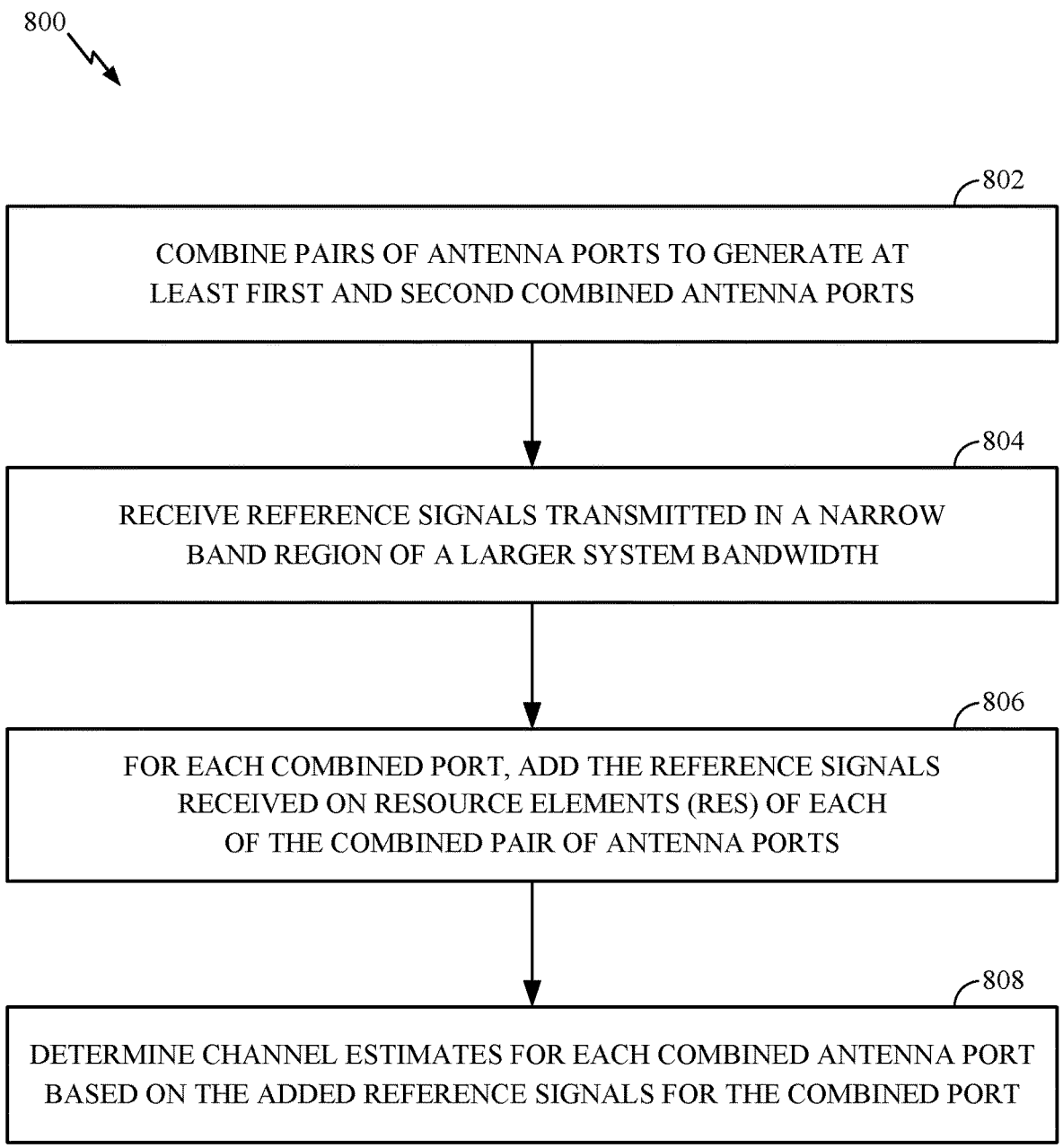
FIG. 8 illustrates example operations performed by a UE for implementing a transmission scheme for NB IoT, in accordance with certain aspects of the present disclosure.

The controller/processor 659 and/or other processors, components and/or modules at the UE 650 may perform or direct operations, for example, operations 800 in FIG. 8, and/or other processes for the techniques described herein for implementing the new transmission scheme. Further, the controller/processor 675 and/or other processors, components and/or modules at the eNB 610 may perform or direct operations, for example, operations 900 in FIG. 9, operations 1000 in FIG. 10, and/or other processes for the techniques described herein for implementing the new transmission scheme. In certain aspects, one or more of any of the components shown in FIG. 6 may be employed to perform example operations 800 and 900, and/or other processes for the techniques described herein. The memories 660 and 676 may store data and program codes for the UE 650 and eNB 610 respectively, accessible and executable by one or more other components of the UE 650 and the eNB 610.

Narrow Band Internet of Things (NB IoT)

Devices may communicate using relative narrowband regions of system bandwidth, such as narrowband internet of things (NB-IoT) devices. To reduce the complexity of UEs, NB-IoT may allow for deployments utilizing one Physical Resource Block (PRB) (180 kHZ+20 kHZ guard band). NB-IoT deployments may utilize higher layer components of LTE and hardware to allow for reduced fragmentation and cross compatibility with, for example, NB-LTE and eMTC (enhanced or evolved Machine Type Communications).

Figure 7:
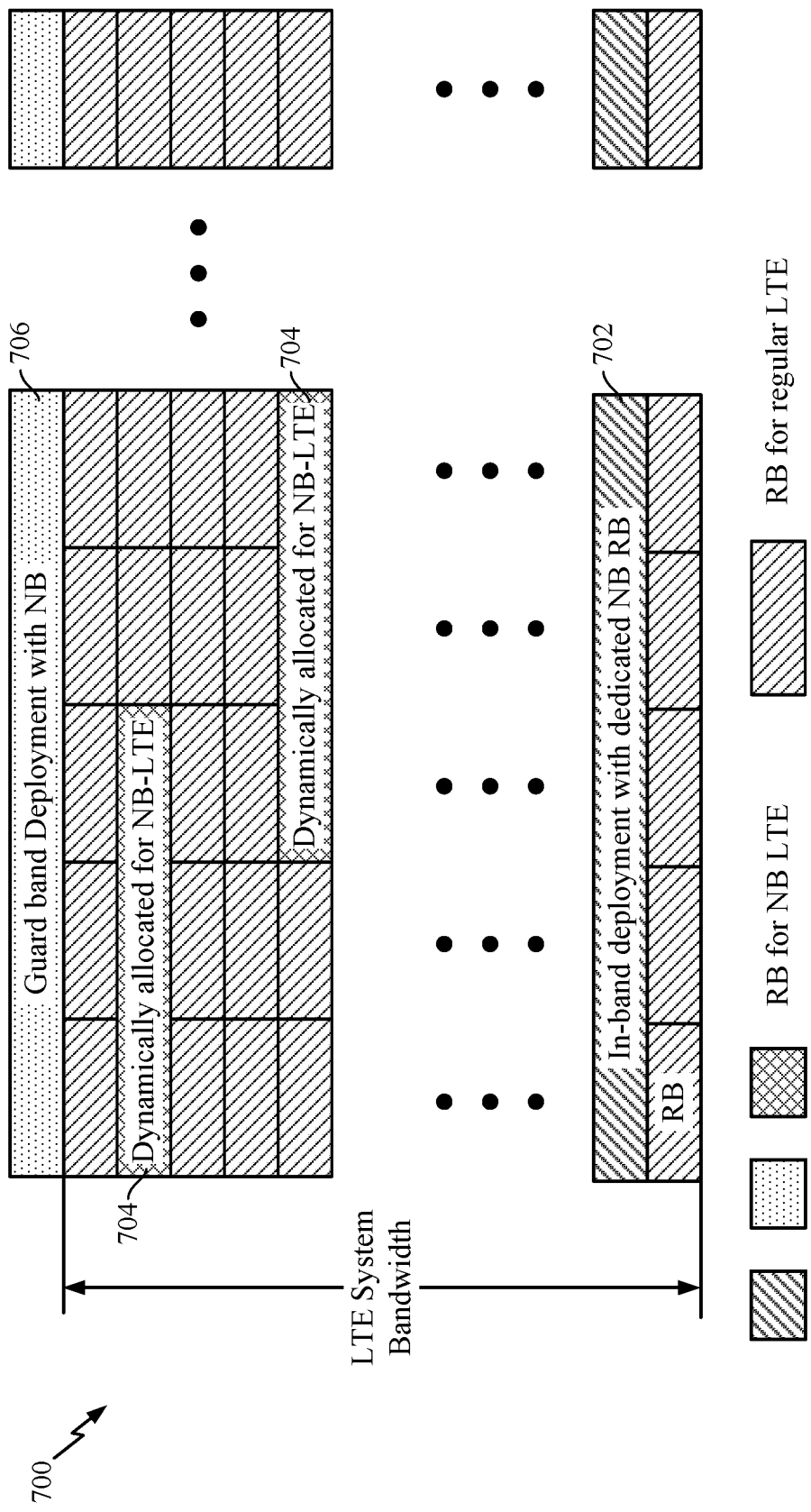
FIG. 7 illustrates an example deployment of NB-IoT, according to certain aspects of the present disclosure.

FIG. 7 illustrates an example deployment 700 of NB-IoT, according to certain aspects of the present disclosure. According to certain aspects, NB-IoT may be deployed in three broad configurations. In certain deployments, NB-IoT may be deployed in-band and coexist with legacy GSM/WCDMA/LTE system(s) deployed in the same frequency band. Wideband LTE channel, for example, may be deployed in, e.g., various bandwidths between 1.4 MHz to 20 MHz, and there may be a dedicated RB 702 available for use by NB-IoT, or the RBs allocated for NB-IoT may be dynamically allocated 704. In an in-band deployment, one resource block (RB), or 200 kHz, of a wideband LTE channel may be used for NB-IoT. LTE implementations may include unused portions of radio spectrum between carriers to guard against interference between adjacent carriers. In some deployments, NB-IoT may be deployed in a guard band 706 of the wideband LTE channel. In other deployments, NB-IoT may be deployed standalone (not shown). In a standalone deployment, one 200 mHz carrier may be utilized to carry NB-IoT traffic and GSM spectrum may be reused.

Deployments of NB-IoT, may include synchronization signals such as PSS for frequency and timing synchronization and SSS to convey system information. According to certain aspects of the present disclosure, synchronization signals of NB-IoT operations occupy narrow channel bandwidths and can coexist with legacy GSM/WCDMA/LTE system(s) deployed in the same frequency band. NB-IoT operations may include PSS/SSS timing boundaries. In certain aspects, these timing boundaries may be extended as compared to the existing PSS/SSS frame boundaries in legacy LTE systems (e.g., 10 ms) to, for example, 40 ms. Based on the timing boundary, a UE is able to receive a PBCH transmission, which may be transmitted in subframe 0 of a radio frame.

Example Data Transmission Scheme for Narrow-Band Internet of Things (Nb-Iot)

The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure.

Narrow-Band IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices.

The NB-IoT technology may be deployed "in-band", utilizing resource blocks within, e.g., a normal LTE or GSM spectrum. In addition, NB-IoT may be deployed in the unused resource blocks within a LTE carrier's guard-band, or "standalone" for deployments in dedicated spectrum.

NB-IoT Downlink (DL) typically uses OFDM with LTE numerology, for example, 15 kHz tone spacing and ~70 us symbol length. The in-band version of NB-IoT uses signals embedded in the wide-band LTE signal. In this case an eNB transmits one of 1-port CRS, 2-port CRS, and 4-port CRS. However, an NB-IoT device (e.g., UE) may support only, e.g., 2-port based diversity scheme, for example, including Space Frequency Block Coding (SFBC), Space Time Block Coding (STBC), precoder cycling, or transmit antenna cycling. The eNB may typically transmit a full power signal only if all existing ports participate in the signal/data transmission. But, at the UE end, this would require estimating the channel for four eNB antennas for a UE Rx antenna.

In certain aspects, an effective transmission scheme for NB-IoT may need to satisfy certain requirements, including, the NB-IoT UE processes only two channel estimates and based on that one pair of REs (e.g., SFBC REs), the eNB is able to use all power for DL transmission for LTE and NB-IoT, the eNB has the same narrow band power boost capability with 4-port CRS as it would have with 2-port CRS, and the eNB has the capability to set non-zero power offsets between its ports, for example ports (0,1) and ports (2,3).

A possible standard-transparent transmission scheme for the NB-IoT may include the eNB borrowing power within the NB-IoT frequency region (e.g., RBs). For example, the eNB borrows power from ports (2, 3) and uses it on ports (0, 1). However, this scheme does not satisfy the requirement of the eNB being able to use all power for DL transmission for LTE and NB-IoT. In addition, power borrowing only works for data but not for CRS port within an NB-IoT RB as outside of the NB-IoT RB.

Another simple non-transparent transmission scheme for the NB-IoT may include the NB-IoT UEs not using the legacy CRS for any channel estimation, as is already the case for in-band PBCH transmission. The same may be extended to all in-band data transmission. The eNB may transmit two NB-IoT specific reference signals. For example, the eNB may use an implementation dependent antenna virtualization scheme to have two NB-IoT antenna ports with four physical antenna ports. However, a drawback of this scheme is the wasted CRS power from the NB-IoT UEs perspective.

Certain aspects of the present disclosure provide a new transmission scheme for the NB-IoT that substantially satisfies the requirements discussed above.

FIG. 8 illustrates example operations 800 performed by a UE for implementing a transmission scheme for NB IoT, in accordance with certain aspects of the present disclosure. Operations 800 begin, at 802, by combining pairs of antenna ports to generate at least first and second combined antenna ports. At 804, the UE receives reference signals transmitted in a narrow band region of a larger system bandwidth. At 806, for each combined port, the UE adds the reference signals received on REs of each of the combined pair of antenna ports. At 808, the UE determines channel estimates for each combined antenna port based on the added reference signals for the combined port.

Figure 9:
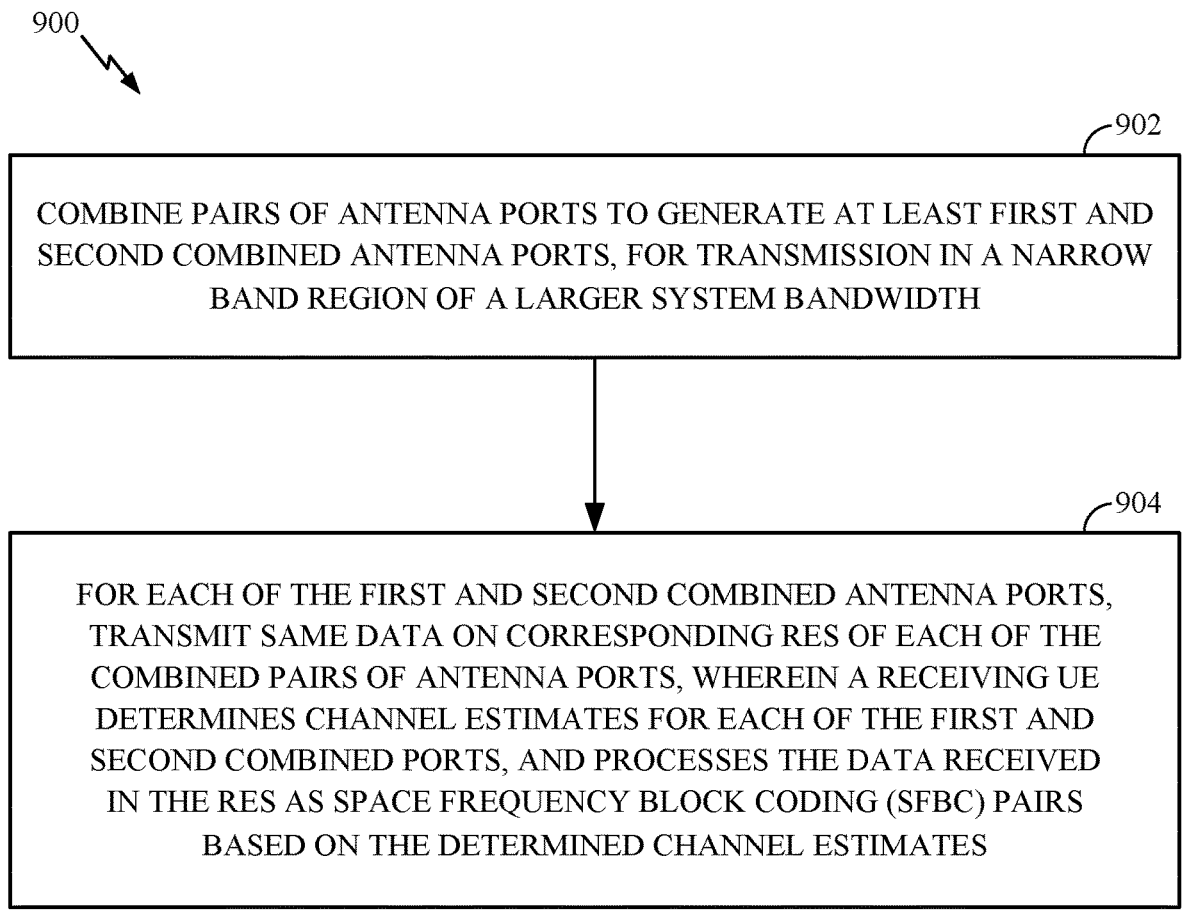
FIG. 9 illustrates example operations performed by a base station for implementing a transmission scheme for NB IoT, in accordance with certain aspects of the present disclosure.

FIG. 9 illustrates example operations 900 performed by a base station for implementing a transmission scheme for NB IoT, in accordance with certain aspects of the present disclosure. Operations 900 begin, at 902, by combining pairs of antenna ports to generate at least first and second combined antenna ports, for transmission in a narrow band region of a larger system bandwidth. At 904, for each of the first and the second combined antenna ports the base station transmits same data on corresponding REs of each of the combined pairs of antenna ports, wherein a receiving UE determines channel estimates for each of the first and second combined ports, and processes the data received in the REs as pairs (e.g., SFBC pairs) based on the determined channel estimates.

In certain aspects, the UE combines pairs of antenna ports before any further processing. For example, the UE combines CRS port 0 with port 2, and CRS port 1 with port 3. In an aspect, the UE adds the signals on the matching REs, for example, after possible Doppler compensation/filtering. The UE then processes two channel estimates based on the combined ports, for example, one estimate for combined ports 0+2 and another estimate for combined ports 1+3. In an aspect, the UE processes all data REs as simple SFBC pairs based on the two channel estimates. In an aspect, to make this technique work, the eNB transmits the same data content on matching REs of the combined ports, for example, REs of both ports 0 and 2 or ports 1 and 3.

In certain aspects, the UE combines pairs of antenna ports after performing some initial processing. For example, the UE descrambles CRS port 0 and CRS port 2 with a first and second scrambling sequence, and combines the resulting descrambled signal. Similarly, the UE descrambles CRS port 1 and CRS port 3 with a third and fourth scrambling sequence, and combines the resulting descrambled signal. In another example, the UE might perform time and/or frequency interpolation on the CRS RE corresponding to ports 0-3 (possibly after performing the descrambling operation indicated above) before combining. In yet another example, the UE might perform descrambling of the CRS RE and Doppler compensation/filtering before combining. The UE then processes two channel estimates based on the combined ports, for example, one estimate for combined ports 0+2 and another estimate for combined ports 1+3. In an aspect, the UE processes all data REs as simple SFBC pairs based on the two channel estimates. In an aspect, to make this technique work, the eNB transmits the same data content on matching REs of the combined ports, for example, REs of both ports 0 and 2 or ports 1 and 3.

In certain aspects, the sum of CRS power offset between the combined ports and the UEs internal combining gains matches the power offset the eNB uses for data. In order to achieve this the eNB may need to know UE's internal combining gain. In an aspect, the UE's combining gain may be standardized or signaled from the eNB to UE or from UE to eNB. In certain aspects, all power offsets may be maintained at 0 dB.

In certain aspects, there is a limit to what combining gain the UE may use when summing ports for channel estimation. This may result in some performance loss, for example, given that the number of REs for ports (2, 3) is only half the number of REs for ports (0, 1). Therefore, the channel observation for ports (2, 3) is noisier. In certain aspects, a possible solution is to combine port 0 with port 1 and port 2 with port 3. Using these port combinations, it is easier to maintain 0 dB power offsets and the SNR is more balanced within each pair. However, in an aspect, this may not provide the best antenna correlation statistics. Another solution may include power boosting ports 2 and 3 by 3 dB. However, this may not satisfy the requirement of the eNB having the same narrow band power boost capability with 4-port CRS as it would have with 2-port CRS. Yet another solution may include adding additional NB-IoT specific reference signals which carry more REs for ports 2 and 3 than for ports 0 and 1, thereby equalizing channel estimation performance for NB-IoT UEs.

In certain aspects, a variation of the transmission scheme discussed above may still include using 4 REs transmitting on 4 ports, but the UE combines pairs of data REs before Log Likelihood Ratio (LLR) generation. In an aspect, the combining is done in the same fashion as for the channel estimation. Further, in an aspect, the CRS scheme and processing is the same as in the previously discussed transmission scheme. In an aspect, this variation is a lesser change to the existing standard as compared to the original scheme. A drawback of this scheme may include increasing the available coding rate, for example, by a factor of 2. This may be a problem above a coding rate of ⅙, but not a problem below the code rate of ⅙.

In certain aspects, the base station might transmit NB-IoT specific RS (NB-RS) in at least a subset of the subframes. In subframes where NB-IoT RS are present, the UE might combine the NB-IoT RS with LTE CRS to perform channel estimation. In some examples, the NB-IoT RS might be transmitted from NB-port 0 and NB-port 1, corresponding to the combined CRS ports 0+2 and 1+3. The UE might then combine the NB-RS with CRS to increase channel estimation accuracy. For example, the UE might perform descrambling, Doppler correction, interpolation and/or addition/combining of RE over the CRS as described above to obtain a first set of channel estimates. Further, the UE might perform a similar operation to the NB-RS to obtain a second set of channel estimates. The UE then combines the first and second set of channel estimates.

In certain aspects, when directly adding channels corresponding to different transmit antenna ports, there is a possibility of destructive combining. This is not different from the basic mechanism of multipath channels creating Rayleigh fading, and thus, need not be a major concern. However, in certain aspect, when the transmit antennas are correlated, it is possible that some dead-zone directions are created, for example, due to small angular spread of departure. In certain aspects, when the Tx antennas at the base station are correlated, for example, because the spread of angle of departure at the base station is small, the phase difference between the Tx antennas observed by the receiver may be the same on each receive antenna and at multiple receiver locations. For example, for the case of observed phase difference close to 180 degrees, the collection of those receiver locations is a dead-zone direction. At these locations, the received signal can be weak and the received SNR low. In the case of line-of-sight, for example, the set of such locations can in fact form a line in a certain direction pointing away from the base station.

A possible solution may include slow phase dithering across antenna ports. Further, phase differential between ports 0 and 2 relative to the differential between ports 1 and 3 may be carefully selected so that dead-zone directions do not overlap.

In certain aspects, the assumption that 2 port diversity scheme (e.g. SFBC) is used for data transmission by NB IoT devices necessitates using pairs of REs close in frequency within the same OFDM symbol. These pairs may be pars of consecutive REs or pairs separated by a single RE (e.g., separated by CRS tone). However, in some cases, the number of such RE pairs is limited, for example, the case of symbol containing CSI-RS or CSI-IM.

Thus, in certain aspects, the same antenna selection diversity scheme may be used as is used for EPDCCH. For example, even and odd numbered REs within the data resource are mapped to alternating antenna ports.

In certain aspects, a new cell specific reference signal (RS) design may be introduced for NB-IoT to allow demodulation of NB-IoT channels and time and frequency tracking. The new RS for NB-IoT may be referred to as NB-RS. In an aspect, the pattern for the NB-RS may be similar to legacy CRS, with one or two antenna ports (APs). As discussed above, legacy LTE allows one, two, or four antenna ports. Further, all channels (except for example PBCH) are rate matched around the correct number of CRS tones.

In certain aspects, for NB-IoT, all channels are rate matched around the two NB-RS ports, even when only one antenna port is available. In an aspect, when only one of the two antenna ports is available, e.g., AP1 is available, in a first alternative, RS positions (e.g., REs) corresponding to AP2 are left empty and RS for AP1 is power boosted. In a second alternative, RS positions corresponding to AP2 are filled with RS corresponding to AP1.

Figure 10:
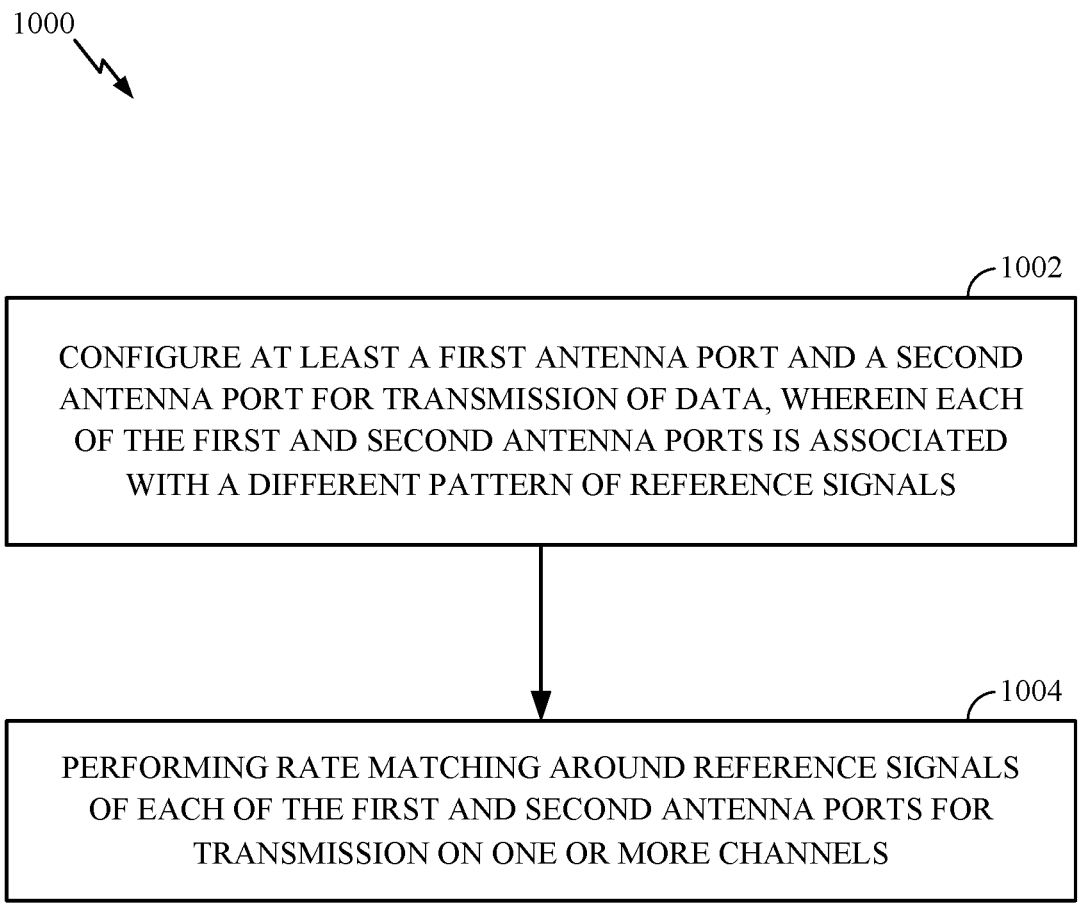
FIG. 10 illustrates example operations, which may be performed by a base station, for NB-IoT transmissions, in accordance with certain aspects of the present disclosure.

FIG. 10 illustrates example operations 1000, which may be performed by a base station, for NB-IoT transmissions, in accordance with certain aspects of the present disclosure.

Operations 1000 begin, at 1002, by configuring at least a first antenna port and a second antenna port for transmission of data (e.g., for NB-IoT), wherein each of the first and the second antennas ports is associated with a different pattern of reference signals. At 1004, the base station performs rate matching around reference signals of each of the first and the second antenna ports for transmission on one or more channels.

Figure 11:
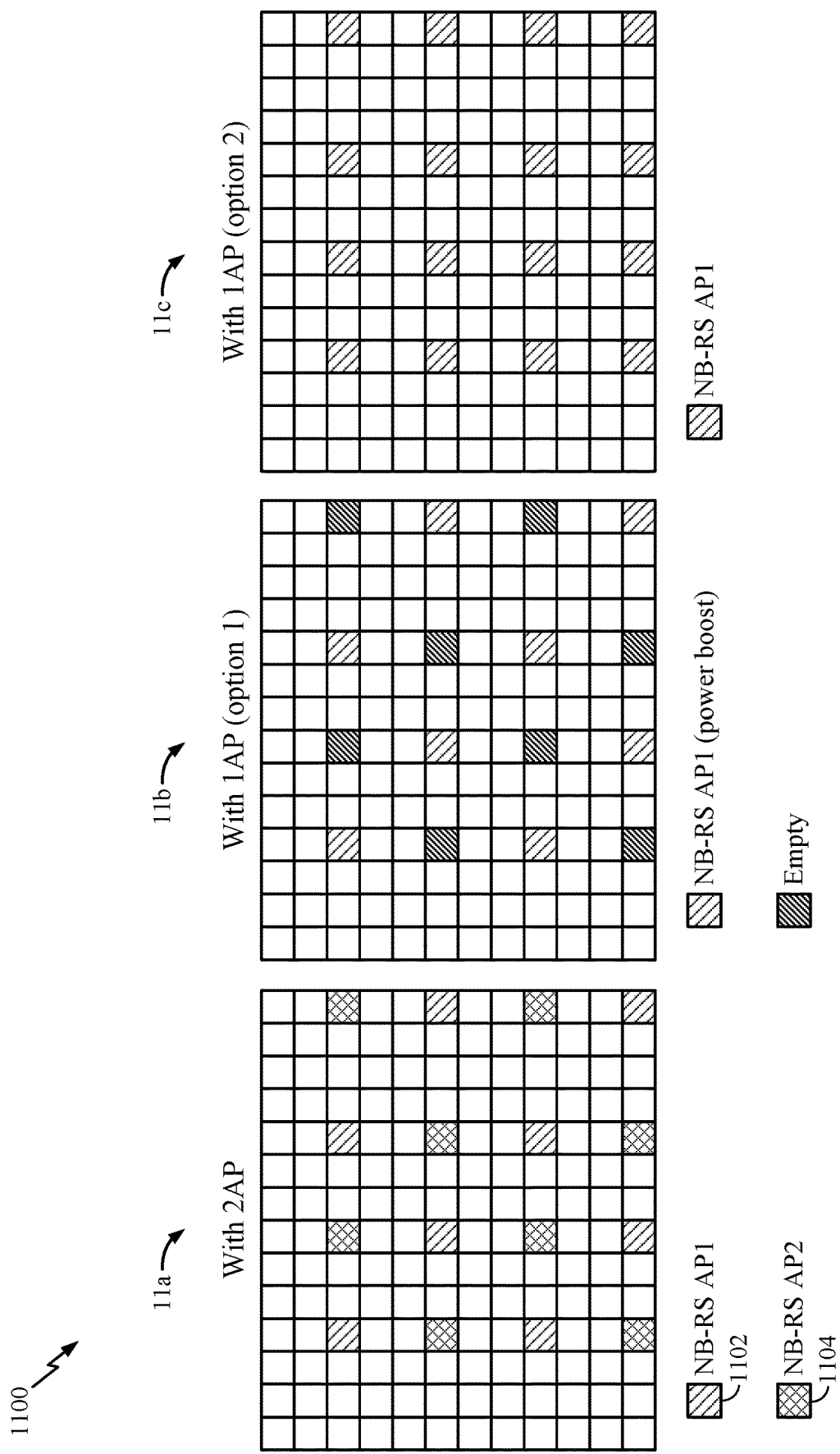
FIG. 11 illustrates example NB-RS patterns in a Resource Block (RB), in accordance with certain aspects of the present disclosure.

FIG. 11 illustrates example NB-RS patterns in a Resource Block (RB), in accordance with certain aspects of the present disclosure. FIG. 11a shows NB-RS patterns for antenna ports AP1, 1102 and AP2, 1104 that may be transmitted in an RB. FIG. 11b illustrates the first alternative discussed above when only AP1 is available. As shown RS positions corresponding to AP2 are left empty while power boosting RS for AP1. FIG. 11c illustrates the second alternative when only AP1 is available. As shown, RS positions corresponding to AP2 are filled with RS corresponding to AP1.

In certain aspects, a hybrid of the first and second alternatives is used, where rate matching/RS design may be different for different subframes. For example, the second alternative may be used in a PBCH subframe and legacy LTE behavior (e.g., rate match around true RS) is used in other subframes. Additionally or alternatively, fake SFBC from the same transmit antenna may be used in a PBCH subframe, and then move to single antenna mode.

In legacy LTE, the RS design is a wideband design. For example, the scrambling sequence for legacy CRS is designed for 110 RBs. This wide band design generally provides good emission properties. However, in NB-IoT, this may not be possible, as the UE may not know its position in the LTE wideband (e.g., at least during initial access. Thus, the CRS does not depend on the frequency position (for example, in PRB position in in-band).

If more than one NB-IoT RBs are configured in the same cell, using the same CRS sequence may lead to emission problems. In certain aspects, a solution may include using different sequences for different RBs. In an aspect the different sequences may be signaled implicitly or explicitly, for example, in SIB. In an aspect, implicit signaling may include transmitting a list of PRBs (e.g. in SIB), wherein the scrambling sequence for each RB is based on one or more of the position of the RB in the list (and possibly other parameters like subframe index, PCID etc), on the separation in frequency with respect to an anchor PRB, or on an absolute frequency position. In an aspect, explicit signaling may include transmitting a list of PRBs and scrambling initialization, for example, in SIB.

Figure 12:
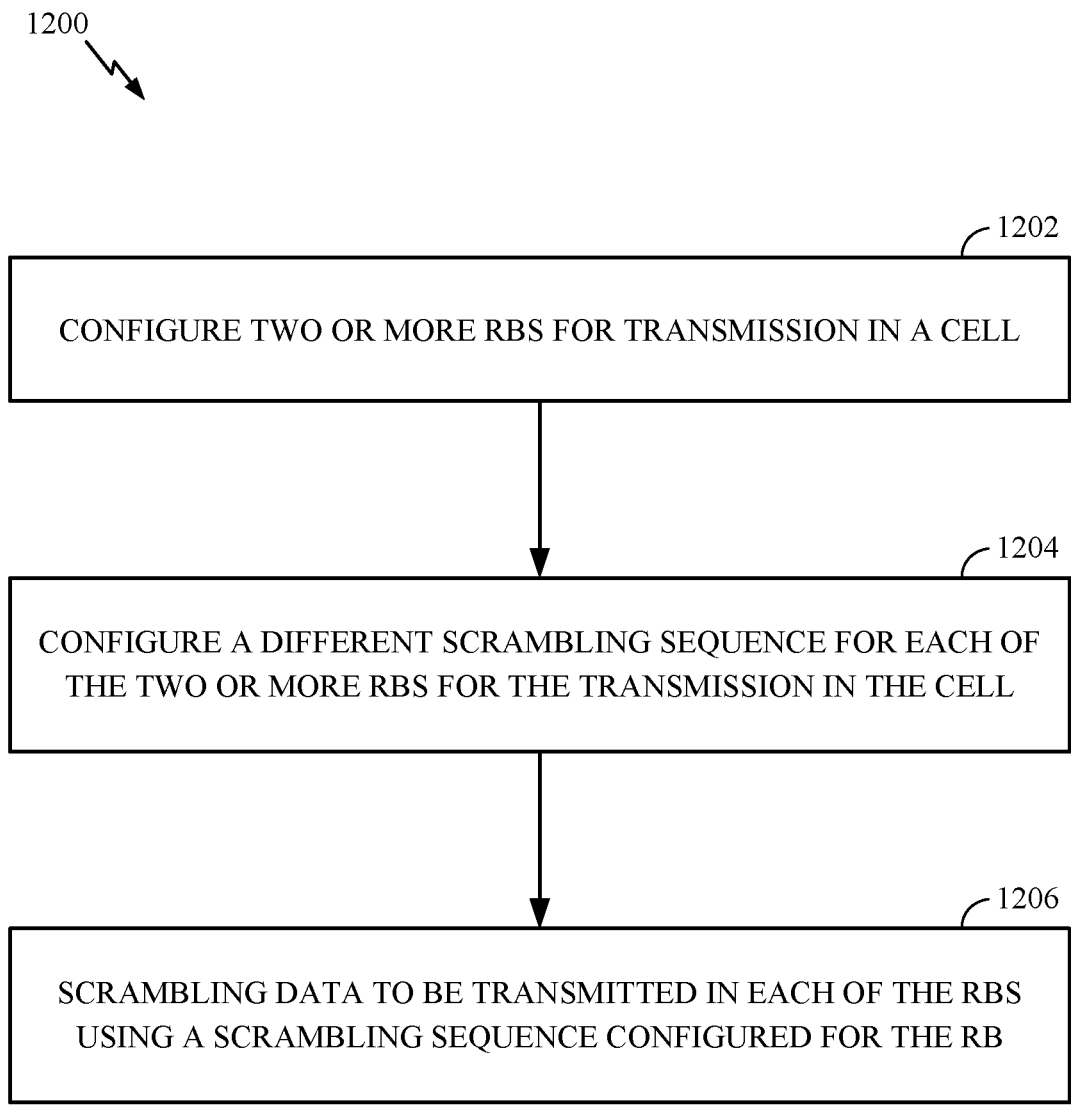
FIG. 12 illustrates using different sequences in different RBs in a cell, in accordance with certain aspects of the present disclosure.

FIG. 12 illustrates operations 1200 for using different sequences in different RBs in a cell, in accordance with certain aspects of the present disclosure. Operations 1200 begin, at 1202, by configuring two or more RBs for transmission in a cell. At 1204, a different scrambling sequence is configured for each of the two or more RBs for the transmission in the cell. At 1206, data to be transmitted in each of the RBs is scrambled using a scrambling sequence configured for the RB.

In alternative aspects, the same sequence is used for the RBs and it is left to the eNB implementation to deal with the emission problems resulting from using the same sequence in different RBs. For example, a different PCI (Physical Cell Identifier) is used in each RB and/or an irregularity is introduced in PRB placement, for example, not deploying equi-spaced NB-IoT PRBs).

Figure 13:
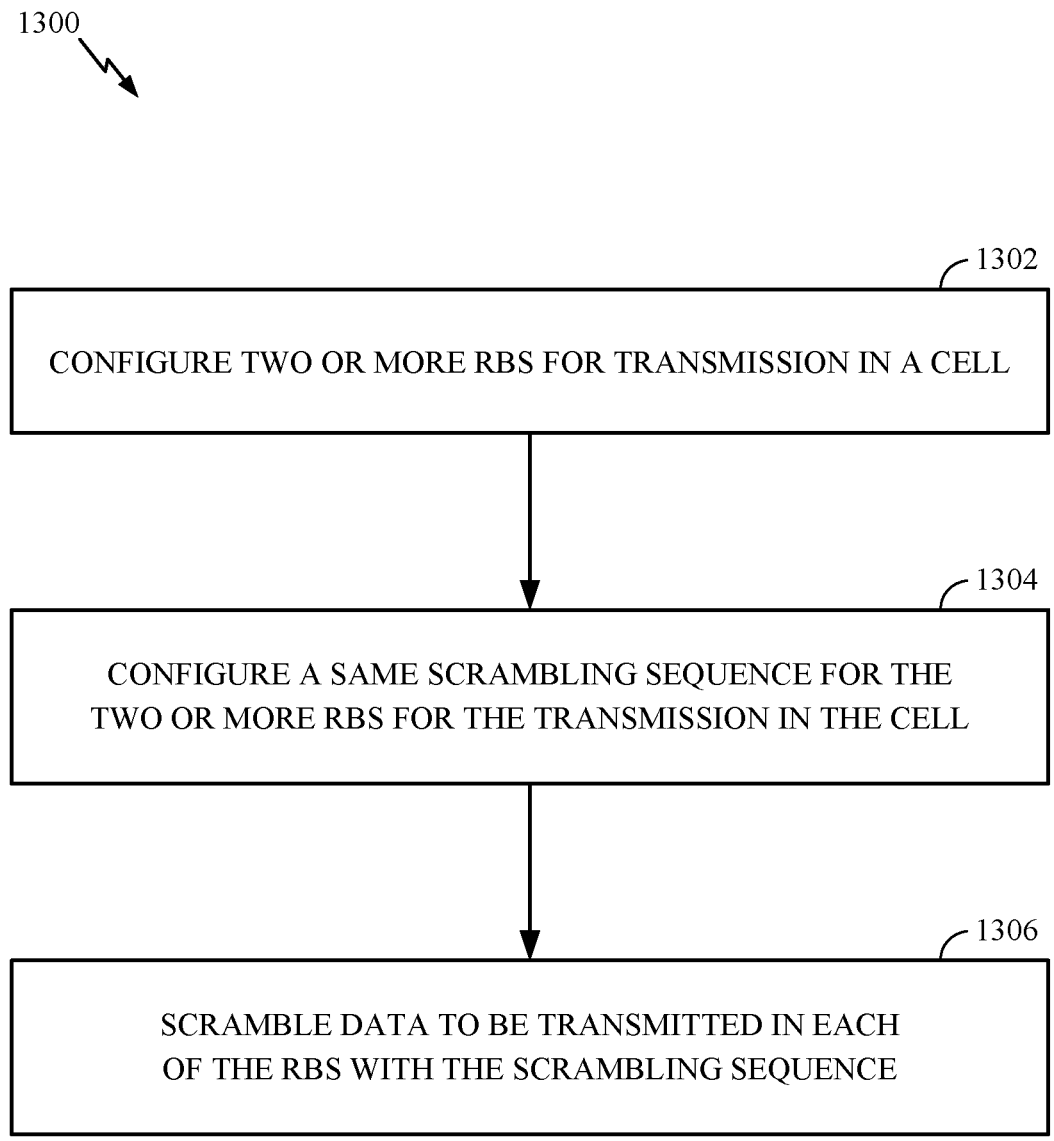
FIG. 13 illustrates using a same sequence in different RBs of a cell, in accordance with certain aspects of the present disclosure.

FIG. 13 illustrates operations 1300 for using a same sequence in different RBs of a cell, in accordance with certain aspects of the present disclosure. Operations 1300 begin, at 1302, by configuring two or more RBs for transmission in a cell. At 1304, a same scrambling sequence is configured for the two or more RBs for the transmission in the cell. At 1306, data to be transmitted in each of the RBs is scrambled with the configured scrambling sequence.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented. Generally, where there are operations illustrated in Figures, those operations may be performed by any suitable corresponding counterpart means-plus-function components.

For example, means for determining, means for selecting, means for performing, means for combining, means for adding, means for obtaining, means for monitoring, and/or means for attempting may include one or more processors (or a processing system), such as controller/processor 675, transmitter processor 616, and/or receive processor 670 of the base station 610 illustrates in FIG. 6, and/or controller/processor 659, receive processor 656, and/or transmit processor 668 of the user equipment 650 illustrated in FIG. 6. Means for transmitting, may include a transmitter, such as transmit processor 616, transceivers 618, and/or antenna(s) 620 of the base station 610 illustrated in FIG. 6, and/or transmit processor 668, transceivers 654, and/or antenna(s) 652 of the user equipment 650 illustrated in FIG. 6. Means for receiving and/or means for obtaining may include a receiver, such as receive processor 670, transceivers 618, and/or antenna(s) 620 of the base station 610 illustrated in FIG. 6 and/or receive processor 656, transceivers 654, and/or antenna(s) 652 of the user equipment 650 illustrated in FIG. 6.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications by a User Equipment (UE), comprising:
    combining pairs of antenna ports to generate at least first and second combined antenna ports;
    receiving reference signals transmitted in a narrow band region of a larger system bandwidth;
    for each combined antenna port, adding the reference signals received on resource elements (REs) of each of the combined pair of antenna ports;
    determining channel estimates for each combined antenna port based on the added reference signals for the respective combined antenna port;
    for each combined antenna port, receiving same data on corresponding REs of each of the combined pair of antenna ports, wherein a sum of a combining gain at the UE and reference signal power offsets within the first and second combined antenna ports matches a power offset for the data; and
    for each combined antenna port, processing the data received on the corresponding REs as Space Frequency Block Coding (SFBC) pairs, based on the determined channel estimate of the combined antenna port.

2. The method of claim 1, wherein adding the reference signals received on resource elements (REs) of each of the combined pair of antenna ports further comprises:
    obtaining a first descrambled signal by descrambling the REs of a first antenna port with a first scrambling sequence;
    obtaining a second descrambled signal by descrambling the REs of a second antenna port with a second scrambling sequence; and
    combining the first descrambled signal with the second descrambled signal.

3. The method of claim 2, wherein the combining comprises adding the descrambled signals.

4. The method of claim 2, wherein the combining comprises:
    performing at least one of time or frequency interpolation on the descrambled signals; and
    adding the interpolated descrambled signals.

5. The method of claim 1, further comprising:
    signaling the combining gain at the UE as a result of combining the pairs of the antenna ports.

6. A method of wireless communications by a Base Station (BS), comprising:
    combining pairs of antenna ports to generate at least first and second combined antenna ports, for transmission in a narrow band region of a larger system bandwidth; and
    for each combined antenna port, transmitting same data on corresponding REs of each of the combined pair of antenna ports, wherein a sum of a combining gain at a receiving User Equipment (UE) and reference signal power offsets within the first and second combined antenna ports matches a power offset for the data,
    wherein for each combined antenna port, channel estimates are determined by the receiving UE and wherein the data transmitted on the corresponding REs are processed by the receiving UE as Space Frequency Block Coding (SFBC) pairs based on the determined channel estimate of the combined antenna port.

7. The method of claim 6, further comprising:
    receiving signaling comprising the combining gain at the receiving UE as a result of combining the pairs of the antenna ports.

8. The method of claim 6, further comprising:
    boosting power of one of the first or second combined antenna ports to match power of the other combined antenna port.

9. An apparatus for wireless communications by a User Equipment (UE), comprising:
    at least one processor; and
    memory coupled to the at least one processor, the memory comprising instructions executable by the at least one processor to cause the apparatus to:
    combine pairs of antenna ports to generate at least first and second combined antenna ports;
    receive reference signals transmitted in a narrow band region of a larger system bandwidth;
    for each combined antenna port, add the reference signals received on resource elements (REs) of each of the combined pair of antenna ports;
    determine channel estimates for each combined antenna port based on the added reference signals for the respective combined antenna port;
    for each combined antenna port, receive same data on corresponding REs of each of the combined pair of antenna ports, wherein a sum of a combining gain at the UE and reference signal power offsets within the first and second combined antenna ports matches a power offset for the data; and
    for each combined antenna port, process the data received on the corresponding REs as Space Frequency Block Coding (SFBC) pairs, based on the determined channel estimate of the combined antenna port.

10. The apparatus of claim 9, wherein the memory further comprises instructions executable by the at least one processor to cause the UE to add the reference signals received on resource elements (REs) of each of the combined pair of antenna ports by:
    obtaining a first descrambled signal by descrambling the REs of a first antenna port with a first scrambling sequence;
    obtaining a second descrambled signal by descrambling the REs of a second antenna port with a second scrambling sequence; and
    combining the first descrambled signal with the second descrambled signal.

11. The apparatus of claim 10, wherein the memory further comprises instructions executable by the at least one processor to cause the UE to perform the combining by adding the descrambled signals.

12. The apparatus of claim 10, wherein the memory further comprises instructions executable by the at least one processor to cause the UE to perform the combining by:
  performing at least one of time or frequency interpolation on the descrambled signals; and
  adding the interpolated descrambled signals.

13. The apparatus of claim 9, wherein the memory further comprises instructions executable by the at least one processor to cause the UE to:
  signal the combining gain at the UE as a result of combining the pairs of the antenna ports.

14. An apparatus for wireless communications by a User Equipment, comprising:
  means for combining pairs of antenna ports to generate at least first and second combined antenna ports;
  means for receiving reference signals transmitted in a narrow band region of a larger system bandwidth;
  for each combined antenna port, means for adding the reference signals received on resource elements (REs) of each of the combined pair of antenna ports;
  means for determining channel estimates for each combined antenna port based on the added reference signals for the respective combined antenna port;
  for each combined antenna port, means for receiving same data on corresponding REs of each of the combined pair of antenna ports, wherein a sum of a combining gain at the UE and reference signal power offsets within the first and second combined antenna ports matches a power offset for the data; and
  for each combined antenna port, means for processing the data received on the corresponding REs as Space Frequency Block Coding (SFBC) pairs, based on the determined channel estimate of the combined antenna port.

15. The apparatus of claim 14, wherein the means for adding the reference signals received on resource elements (REs) of each of the combined pair of antenna ports is configured to:
  obtain a first descrambled signal by descrambling the REs of a first antenna port with a first scrambling sequence;
  obtain a second descrambled signal by descrambling the REs of a second antenna port with a second scrambling sequence; and
  combine the first descrambled signal with the second descrambled signal.

16. The apparatus of claim 15, wherein the means for combining is configured to add the descrambled signals.

17. The apparatus of claim 15, wherein the means for combining is configured to:
  perform at least one of time or frequency interpolation on the descrambled signals; and
  add the interpolated descrambled signals.

18. The apparatus of claim 14, further comprising:
  means for signaling the combining gain at the UE as a result of combining the pairs of the antenna ports.

19. A non-transitory computer-readable medium storing instructions executable by at least one processor to cause a User Equipment (UE) to perform a method comprising:
  combining pairs of antenna ports to generate at least first and second combined antenna ports;
  receiving reference signals transmitted in a narrow band region of a larger system bandwidth;
  for each combined antenna port, adding the reference signals received on resource elements (REs) of each of the combined pair of antenna ports;
  determining channel estimates for each combined antenna port based on the added reference signals for the respective combined antenna port;
  for each combined antenna port, receiving same data on corresponding REs of each of the combined pair of antenna ports, wherein a sum of a combining gain at the UE and reference signal power offsets within the first and second combined antenna ports matches a power offset for the data; and
  for each combined antenna port, processing the data received on the corresponding REs as Space Frequency Block Coding (SFBC) pairs, based on the determined channel estimate of the combined antenna port.

20. The computer-readable medium of claim 19, wherein adding the reference signals received on resource elements (REs) of each of the combined pair of antenna ports further comprises:
  obtaining a first descrambled signal by descrambling the REs of a first antenna port with a first scrambling sequence;
  obtaining a second descrambled signal by descrambling the REs of a second antenna port with a second scrambling sequence; and
  combining the first descrambled signal with the second descrambled signal.

21. The computer-readable medium of claim 20, wherein the combining comprises adding the descrambled signals.

22. The computer-readable medium of claim 20, wherein the combining comprises:
  performing at least one of time or frequency interpolation on the descrambled signals; and
  adding the interpolated descrambled signals.

23. The computer-readable medium of claim 19, further comprising instructions for:
  signaling the combining gain at the UE as a result of combining the pairs of the antenna ports.

24. An apparatus for wireless communications by a Base Station (BS), comprising:
  at least one processor; and
  memory coupled to the at least one processor, the memory comprising instructions executable by the at least one processor to cause the BS to:
  combine pairs of antenna ports to generate at least first and second combined antenna ports, for transmission in a narrow band region of a larger system bandwidth; and
  for each combined antenna port, transmit same data on corresponding REs of each of the combined pair of antenna ports, wherein a sum of a combining gain at a receiving User Equipment (UE) and reference signal power offsets within the first and second combined antenna ports matches a power offset for the data,
  wherein for each combined antenna port, channel estimates are determined by the receiving UE and wherein the data transmitted on the corresponding REs are processed by the receiving UE as pairs based on the determined channel estimate of the combined antenna port.

25. The apparatus of claim 24, wherein the memory comprising instructions executable by the at least one processor to cause the BS to:
  receive signaling comprising the combining gain at the receiving UE as a result of combining the pairs of the antenna ports.

26. The apparatus of claim 24, wherein the memory further comprises instructions executable by the at least one processor to cause the BS to:

boost power of one of the first or second combined antenna ports to match power of the other combined antenna port.

27. An apparatus for wireless communications by a Base Station (BS), comprising:
   means for combining pairs of antenna ports to generate at least first and second combined antenna ports, for transmission in a narrow band region of a larger system bandwidth; and
   for each combined antenna port, means for transmitting same data on corresponding REs of each of the combined pair of antenna ports, wherein a sum of a combining gain at a receiving User Equipment (UE) and reference signal power offsets within the first and second combined antenna ports matches a power offset for the data,
   wherein for each combined antenna port, channel estimates are determined by a receiving UE and wherein the data transmitted on the corresponding REs are processed by the receiving UE as pairs based on the determined channel estimate of the combined antenna port.

28. The apparatus of claim 27, further comprising:
means for receiving signaling comprising the combining gain at the receiving UE as a result of combining the pairs of the antenna ports.

29. The apparatus of claim 27, further comprising:
means for boosting power of one of the first or second combined antenna ports to match power of the other combined antenna port.

30. A non-transitory computer-readable medium storing instructions executable by at least one processor to cause a Base Station (BS) to perform a method comprising:
   combining pairs of antenna ports to generate at least first and second combined antenna ports, for transmission in a narrow band region of a larger system bandwidth; and
   for each combined antenna port, transmitting same data on corresponding REs of each of the combined pair of antenna ports, wherein a sum of a combining gain at a receiving User Equipment (UE) and reference signal power offsets within the first and second combined antenna ports matches a power offset for the data,
   wherein for each combined antenna port, channel estimates are determined by the receiving UE and wherein the data transmitted on the corresponding REs are processed by the receiving UE as pairs based on the determined channel estimate of the combined antenna port.

31. The computer-readable medium of claim 30, further comprising:
   instructions for receiving signaling comprising the combining gain at the UE as a result of combining the pairs of the antenna ports.

32. The computer-readable medium of claim 30, further comprising:
   instructions for boosting power of one of the first or second combined antenna ports to match power of the other combined antenna port.

* * * * *